(12) United States Patent
Heim

(10) Patent No.: US 6,244,911 B1
(45) Date of Patent: Jun. 12, 2001

(54) CONTACT ELEMENT AND A SIM CARD CONTACTING APPARATUS USING SAID CONTACT ELEMENT

(75) Inventor: Michael Heim, Heilbronn (DE)

(73) Assignee: Amphenol-Tuchel Electronics GmbH (DE)

(*) Notice: Subject to any disclaimer, the term of this patent is extended or adjusted under 35 U.S.C. 154(b) by 0 days.

(21) Appl. No.: 09/327,495

(22) Filed: Jun. 8, 1999

(30) Foreign Application Priority Data

Jun. 9, 1998 (DE) .............................................. 198 25 808

(51) Int. Cl.⁷ ...................................................... H01R 4/48
(52) U.S. Cl. ............................................. 439/862; 439/630
(58) Field of Search ...................................... 439/862, 630, 439/60, 260, 751, 733.1

(56) References Cited

U.S. PATENT DOCUMENTS

| 5,586,890 | * | 12/1996 | Braun ..................................... 439/630 |
| 5,746,607 | * | 5/1998 | Bricaud et al. ........................ 439/630 |
| 5,882,230 | * | 3/1999 | Bricaud et al. ........................ 439/630 |
| 5,980,323 | * | 11/1999 | Bricaud et al. ........................ 439/862 |

* cited by examiner

*Primary Examiner*—Tho D. Ta
(74) *Attorney, Agent, or Firm*—Blank Rome Comisky & McCauley, LLP

(57) ABSTRACT

A contact element for a smart card contacting apparatus, the contact element comprising a substantially straight first or contact leg having a contact end and at least one second or mounting leg which is substantially straight, wherein the mounting leg is arranged adjacent to the contact leg.

28 Claims, 4 Drawing Sheets

CONTACT ELEMENT AND A SIM CARD CONTACTING APPARATUS USING SAID CONTACT ELEMENT

BACKGROUND OF THE INVENTION

The present invention relates to a contact element and to a SIM card contacting apparatus using such a contact element. More generally, the invention also relates to a contact element for a chip or smart card reader as well as to a chip or smart card reader using such a contact element.

As is well-known, chip or smart cards are used for various purposes, for instance as prepaid telephone cards. Such a telephone card allow the purchase to insert the card into a public telephone ant then make telephone calls equivalent to the amount of money paid for said telephone card. Chip cards are also used to identify members of, for instance, a health organization and so on. SIM cards derive their name form the words "subscriber identity module". SIM cards are frequently used in so-called cell phones, for instance to identify a subscriber of the respective telephone company. SIM cards are much smaller than smart cards, Thus, certain SIM card specific problems can occurs when they need to be "read" or contacted. Accordingly, the present invention relates in particular and preferably to contact elements and contacting apparatus for SIM cards and, more generally, to contacts and contacting apparatus for chip or smart cards.

In particular, the need to miniaturize cell phone to an extent as large as possible, sets high demands for the contact elements and the SIM card contacting apparatus using said contact elements to contact the contact areas or pads on the SIM card.

Due to the continuing strive for miniaturization, problems need to be addressed which can occur when contacting SIM cards. To provide for a reliable contact engagement with the contact pads or contact areas of a SIM card, a certain minimum pressure or a certain minimum force is required by means of which contact elements of a smart card contacting apparatus presses against the contact pads of the SIM card. So as to reach said minimum pressure when using contact springs, a certain spring path or spring deflection is required. With the presently used materials for the contact elements, the contact elements need to have a certain free length so as to provide for the necessary spring or deflection path without leaving the elastic range of the contact element. If the elastic range of the contact element is exceeded, then the contact element will remain deformed so that a reliable contact engagement is no longer warranted.

For better tolerance and for a safe and secure contact pressure, a relatively long spring or contact deflection path is desirable.

So far, contact elements were in substance linear leaf springs extending in one direction only. Thus, the required length of the contact elements determines for a certain spring or contact deflection path also the size of a contact block within which the contact elements are supported.

When designing reading and switching contact elements a beam element was used as a contact element. Said beam element was fixedly mounted at its; one end and was deflected by means of the chip or SIM card, thus creating the required contact element force applied to the contact area of a SIM card. Reading contact elements are contact elements which are typically used to "read" out information stored in the SIM card. Switching contact elements are used for instance to provide information whether a chip card, in particular a SIM card, is inserted into a respective contacting apparatus. Continuing with the description of the prior art, it should be noted that the contact element just described is subject to bending during its use. Frequently, the support of the contact element acts said a spring and is designed in trapezoidal form.

So as to reduce even more the requirement for space for a chip card or smart card in particular a SIM contacting apparatus, for instance to make a smaller cell phone possible, or to provide for the use of more components for the same size cell phone, the invention intends to optimize a SIM or chip card contacting apparatus with respect to the required space such that a reliable contacting engagement of the contacting areas of a SIM or chip card is not jeopardized.

It is, in particular, an object of the invention to maintain a small height or thickness of a contact block carrying the contact elements of, for instance, 1.2 mm and to reduce the distance of terminal portions, e.g. soldering terminal portions of the contact elements down to a small value. For instance, it is desired to reduce the distance between the terminal portions on opposite sides of the contact block from about 26 mm down to about 15 mm, due to the curvilinear structure of the contact element as opposed to linear or straight contact elements.

SUMMARY OF THE INVENTION

In accordance with one embodiment of the present invention, there is provided a contact(ing) element preferably for use in a SIM card contacting apparatus, said contact element comprising an essentially straight first or contact leg having a contact end, and at least one substantially straight second or mounting leg, wherein the mounting leg is located adjacent to said contacting leg and extends preferably parallel thereto.

In accordance with a preferred embodiment, the mounting leg of the contact element is longer than the contact leg of the contact element such that the contact element is, in plan view, substantially J-shaped. Expressed somewhat differently, the contact element is, in general, about U-shaped, wherein one leg of the U is shorter than the other.

The contact element of the invention acts as a bending/torsion-spring.

In accordance with a preferred embodiment of the invention, the mounting leg of the contact element is connected with a termination portion, in particular a soldering termination portion. Preferably, the mounting leg is integrally formed together with said termination portion.

In accordance with the invention, the contact element comprises a transition portion which connects the first and second legs. The transition portion preferably defines an outer edge which comprises in substance two quarter circles with a second radius and a straight portion between said quarter circles.

For the J-shaped embodiment, the contact element comprises a transition portion with an inner edge having in substance the shape of a semi circle with a first radius. Preferably, the mounting leg has a width which is smaller than the width of the contacting leg. The width of the transition portion in the apex point, i.e. at the transition between said two legs, is in substance equal to the width of the contact leg.

In accordance with another embodiment of the invention a contact element, in particular for a SIM card contacting apparatus, is provided, said contact element comprising two substantially straight support legs and one substantially straight contacting leg, said contacting leg being located between said two mounting legs and comprising a contacting end. This embodiment can be called a W-shaped embodiment Preferably, the legs extend parallel to each other.

In accordance with a preferred W-shaped embodiment, the contacting leg of the contact element is shorter than the mounting legs and the mounting legs of the contacting element are approximately of equal length.

Preferably, the W-shaped contact element comprises a transition portion which connects the legs with each other. The transition portion comprises preferably an outer edge which consists essentially of two quarter circles having a second radius with a straight portion in between. The inner edge of the transition portion in the area between the straight portion of the contact leg and the apex point of the respective transition between the contact leg and the respective mounting leg comprises preferably an approximately parabolic contour. Approximately, in the apex point said parabolic contour merges in what is in substance a quarter circle with a first radius, wherein one end of the quarter circle merges into the straight edge of the respective mounting leg. The width of the contact leg is preferably equal to each of said widths of the two mounting legs. The width of the transition portion in the apex point of the respective transition between the contact leg and the respective mounting leg is preferably equal to the width of the contact leg or the width of the mounting leg.

Preferably, at least one of the mounting legs of the W-shaped contact element is connected with a terminal portion, in particular a soldering terminal. Preferably, at least one of said mounting legs is formed integrally with a terminal portion.

Preferably, the legs of the contact element are substantially in one plane with the contact end of the contact leg projecting out of said plane.

According to a preferred embodiment, the contact element is a leaf spring. Preferably, the contact element is formed by stamping and bending. The contact element is preferably made of metal or a metal alloy.

In accordance with a preferred embodiment of the invention, the contact element is used in a SIM card contacting apparatus. Said contact element is preferably a leaf spring which is located substantially in one plane, with the exception that a contacting end of said leaf spring extends or projects out of said plane. The leaf spring comprises a first section located in said plane and a second section located in the same plane. The first and second sections are substantially parallel and adjacent to each other. A transition portion connects the first and second sections.

In accordance with a preferred embodiment, the leaf spring comprises a third section also located in the same plane and extending substantially parallel to the first section. The third section is placed opposite to the second section and is adjacent to the first section. The transition portion connects said first, second and third sections. As mentioned, the contact element described above, is used for contacting a chip card, in particular a SIM card and is preferably arranged in a SIM or chip card contacting apparatus.

In accordance with a preferred embodiment of the invention, the contact elements are held or fixedly mounted in a contact block by injection molding. When the contact block is injected molded from plastic material, said plastic material surrounds said contact elements in an area where they are to be fixedly mounted in the contact block so that no insertion of the contact elements into the contact block is necessary. However, in accordance with the invention, it is also conceivable to insert the contact elements into cavities or recesses formed In a contact block with detent or locking means being employed to fixedly mount said contact elements in said contact block.

The contact block has preferably a smaller dimension as seen in the longitudinal direction of the SIM card to be contacted. In particular, terminal portions of said contact elements project out of the contact block. Therefore, it can be said the contact block provides at respective sides said terminal portions which extend transversely to said longitudinal direction. Preferably each of said contact element has terminal portions which can be preferably soldering terminal portions.

The contact element of the invention is wider than a customary contact element, but has a much shorter length. Inasmuch as the distances for the contact points of the chip card are predetermined, the larger width of the contact elements does not pose any problem. The shorter length, however, makes for a more compact contacting apparatus. The required spring force is generated within a small space or area.

In accordance with a preferred embodiment, the resulting contact block, also called a SIMLOCK® or SIMBLOCK® for SIM cards, is in longitudinal direction of the SIM card smaller than the SIM card itself. The distance of the terminal portions on the one side of the contact block from the terminal portion on the other side of the contact block can be reduced to about 15.2 mm. This is a substantial improvement with respect to the presently customary 26.5 mm. Fourty per cent more space in gained on the printed circuit board onto which the SIM card contacting apparatus can be mounted. This has the consequence that for instance more components can be placed under the SIM card.

Further advantages, features and objects of the invention can be gathered from the following description of preferred embodiments together with the drawing.

BRIEF DESCRIPTION OF THE DRAWINGS

FIG. 1 discloses a preferred embodiment of a contact element 1 of the invention. The contact element 1 comprises a first leg, also called a contact leg 2 having a contact end 3. Further, the contact element 1 comprises a second leg, also called a mounting leg 4. The mounting leg 4 is preferably arranged parallel and adjacent to the contact leg 2. Both legs 2 and 4 are connected with each other by means of a connecting or transition portion 5.

FIG. 2 discloses that the contact element 1 extends, in substance, in one plane, however, a portion of the contact leg 2 forming the contact end 3 extends out of said plane in an upward direction.

FIG. 3 discloses a SIM card contacting apparatus 10 which comprises contact elements 10 of the type substantially as disclosed in FIGS. 1 and 2. In fact, the contact elements 1, as shown in FIGS. 3 and 4, have soldering or terminal portions 12 integrally formed by the free ends of said mounting legs 4 (see FIG. 4). Said soldering portions 12 can also be connected in a different way to said free ends of said mounting legs 4.

Figure 1:
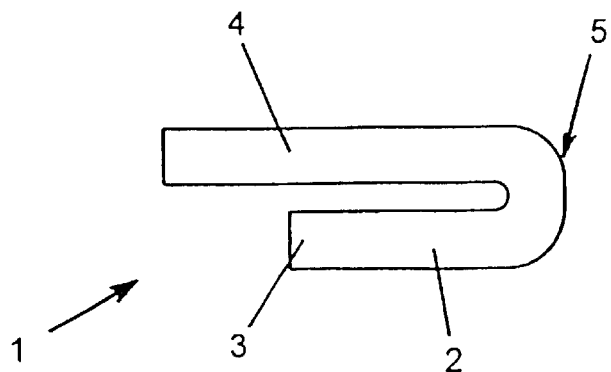
FIG. 1 is a top plan view of a contact element in accordance with a first embodiment of the invention.

The contact elements 1 are preferably fixedly mounted in a contact block 11 by injection molding. In this case, the plastic material of the contact block 11 surrounds partly the free ends of said mounting legs 4 (leaving the terminal portions 12 uncovered). However, it is also possible to mount the contact elements 5 in a contact block 11 by detent action between detent means formed by the contact elements 1 and by detent means formed by the contact block. The terminal portion 12 can be such that it is suitable for the SMD technique. It is also possible to design the terminal portion as a non-soldering terminal, for instance as a press-in connection or as any other suitable connection.

The contact block 11 comprises a frame-like portion which defines and surrounds an opening 13. Preferably, the frame-like portion of the contact block 11 forms two parallel spaced projections 14 and 15 which define a recess 16 into which (a group of) the terminal portions 12 extend.

It is noted that the projections 14 and 15 need not be provided in a situation where a simplified contact block is useful, e.g. a contact block which does not require a cover (not shown) adapted to receive a SIM card and being pivotally connected to said projections 14 and 15.

Figure 3:
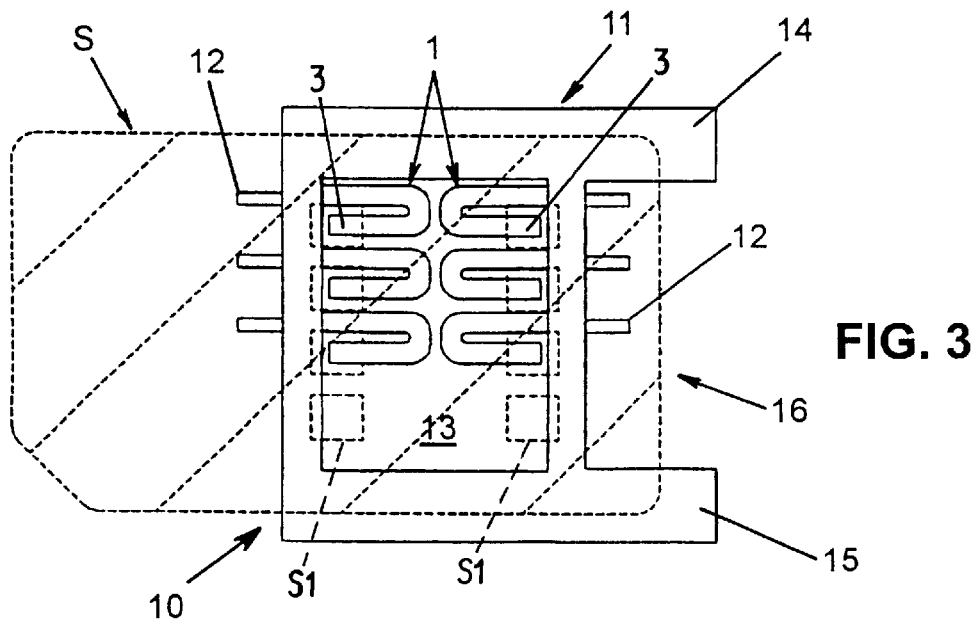
FIG. 3 is a top plan view of a SIM card contacting apparatus comprising contact elements in accordance with the first embodiment of the invention.

The SIM card is shown in FIG. 3 by dotted lines and is referred to by reference sign S. As is well-known in the art, a SIM (subscriber identity module) card is a smaller version of a smart or chip card.

Figure 4:
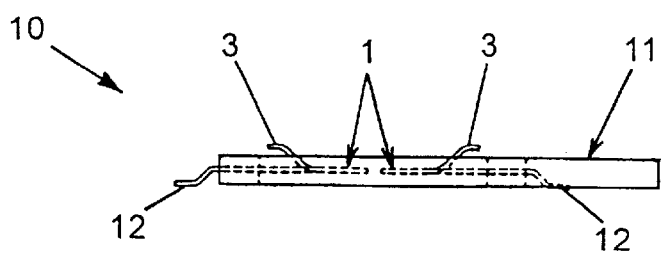
FIG. 4 is a side eleventional view of the SIM card contacting apparatus of FIG. 3.

As is clearly shown in FIG. 4, the contact ends 3 of the contact elements 1 project beyond the top surface of the contact block 11 upwardly so as to allow for a contact engagement with the contact pads or areas of a SIM card S. For instance, a SIM card S would be moved (see FIG. 4) from an elevated position towards the top surface of the contact block 11. During said movement, the contact pads S1 of the SIM card S initially would come into contact with the contact ends 3 of the contact elements 1. During further movement of the SIM card S towards the top surface of the contact block 11, the contact elements 1, i.e. the contact ends 3, would be deflected until the SIM card S is finally placed on the top surface of the contact block 11. The spring characteristics and the amount of deflection (spring path) of the contact elements 1 are selected such that the desired contact pressure or force results, i.e. the force or pressure with which the contact ends 3 engage said contact pads S1.

Preferably, as shown in FIGS. 3 and 4, a plurality of contact elements 1 is fixedly mounted in said contact block 11, such that the contact elements 1 are arranged in pairs which are located adjacent and parallel to each other. The transition portions 5 of each pair are located adjacent and opposite to each other. The contact ends 3 of oppositely arranged pairs of contact elements 1 have their free ends located adjacent to opposite walls of said frame-like portion of the contact block 11.

Figure 5:
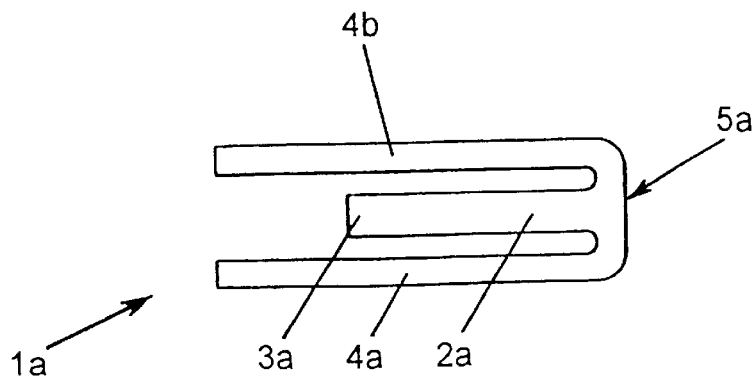
FIG. 5 is a top plan view of a contact element according to a second embodiment of the invention.
Figure 6:
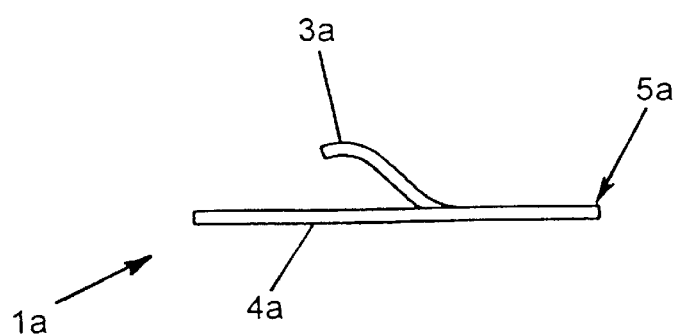
FIG. 6 is a side eleventional view of the contact element of FIG. 5.

FIGS. 5 and 6 disclose another embodiment of a contact element 1a of the invention. As far as possible, the same reference numerals as in the preceding embodiment are used for similar components with the letter "a" being added for reasons of clarity.

As is shown in FIG. 1, contact element 1a comprises a first or central leg (contact leg) 2a having a contact end 3a. The contact element 1a further comprises a second or mounting leg 4a and a third leg or further mounting leg 4b. Mounting legs 4a and 4b extend parallel to the contact leg 2a on opposite sides thereof and adjacent to the contact leg 2a. The three legs 2a, 4a and 4b are connected to each other by means of a connecting or transition portion 5a.

FIG. 6 shows that the contact element 1a is located In substance in one plane. In substance, only that portion of the contact leg 2a which carries or forms the contact end 3a extends out of said plane and projects upwardly.

Figure 7:
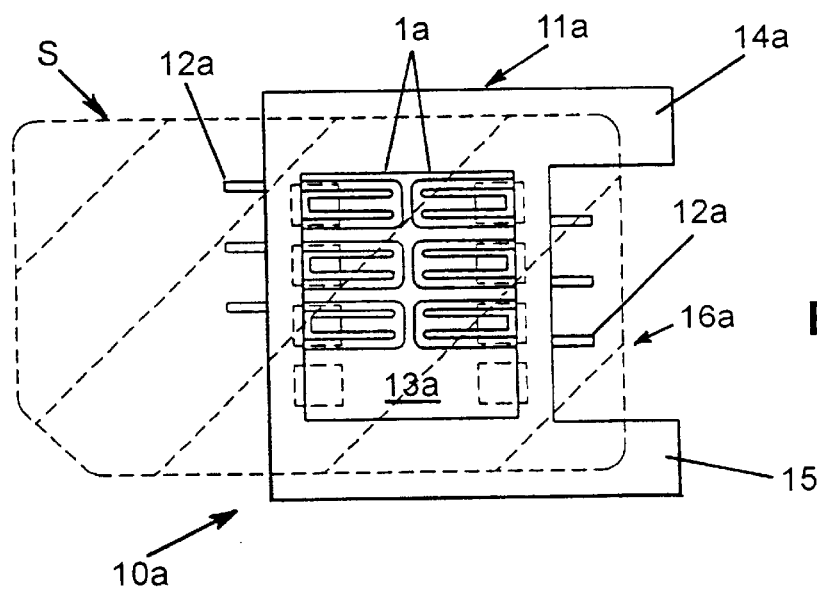
FIG. 7 is a top plan view of a chip card contacting apparatus using contact elements according to the second embodiment of the invention.

FIG. 7 discloses a SIM card contacting apparatus 10a which is largely identical to the SIM card contacting apparatus 10 shown in FIGS. 3 and 4. In the SIM card contacting apparatus 10a, however, the contact elements 1a are designed in accordance with the second embodiment of contact elements shown in FIGS. 5 and 6.

Figure 8:
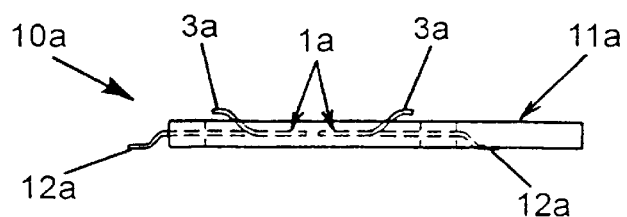
FIG. 8 is a side eleventional view of the contacting apparatus of FIG. 7.

As far as the description of the SIM card contacting apparatus 10a is concerned, reference is made to the description of the smart card contacting apparatus of FIGS. 3 and 4. In FIGS. 7 and 8, however, the respective reference numerals have the suffix "a" added.

Figure 2:
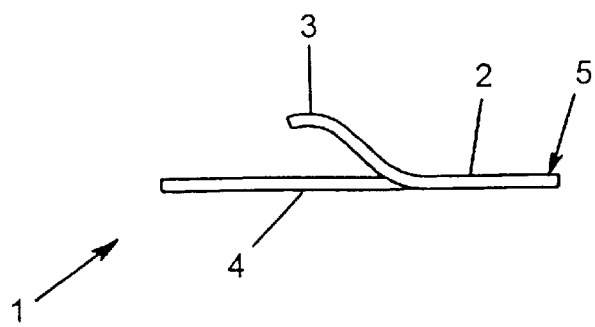
FIG. 2 is a side eleventional view of the contact element of FIG. 1.
Figure 9:
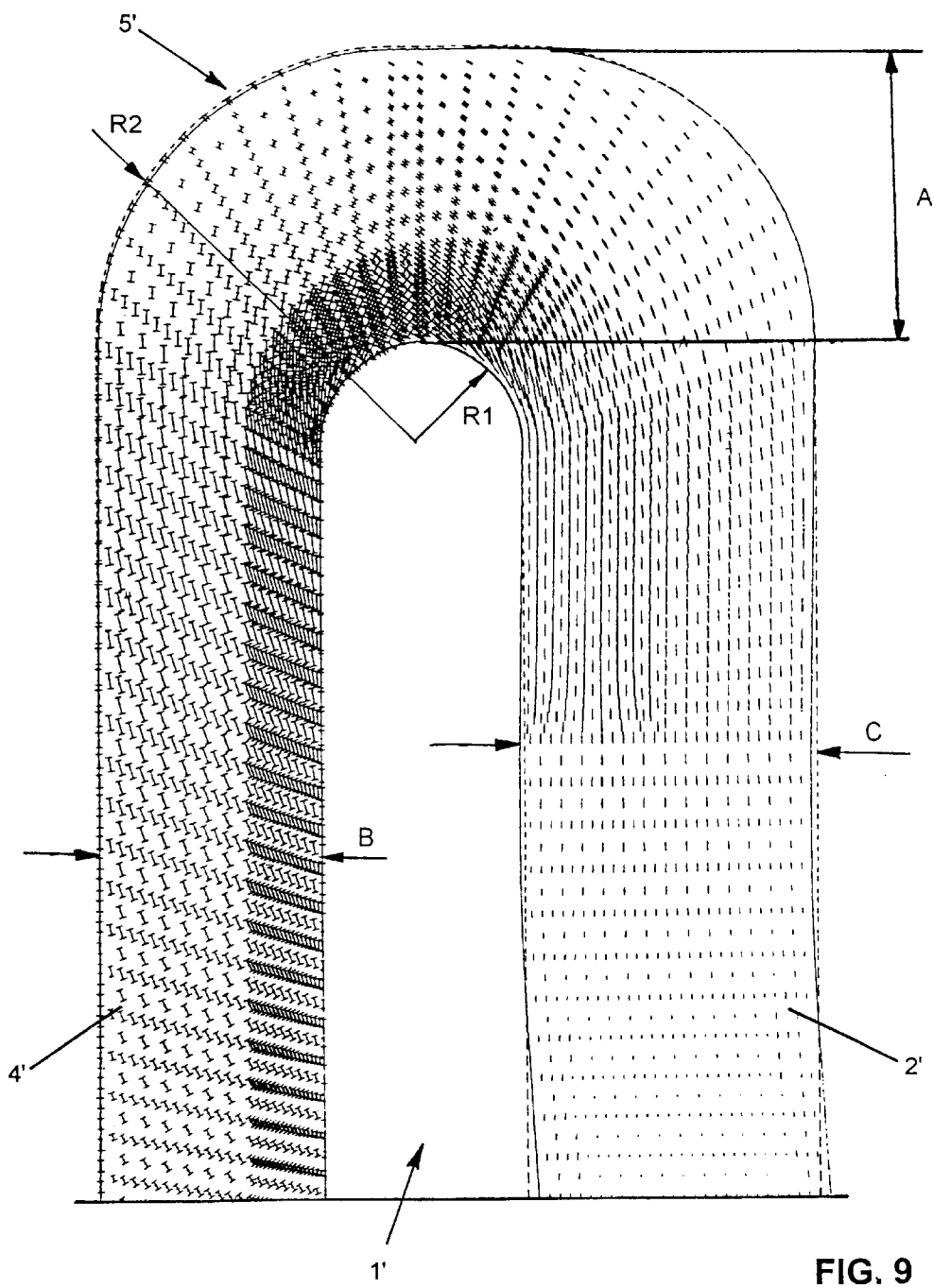
FIG. 9 is an enlarged top plan view of a portion of a contact element similar to FIG. 1 having an optimized contour of the edges.

FIG. 9 discloses a portion of a contact element 1' which is similar to the contact element 1 of FIGS. 1 and 2. However, the contact element 1' has an optimized contour of the edges (or the perimeter) of the contact element. The substantially straight mounting leg 4' comprises a width B which is smaller than the width C of the also substantially straight contact leg 2'. Preferably, the contact leg 2' extends parallel to the mounting leg 4'.

The width A of the transition portion 5' in the apex of the transition between said two legs 2' and 4' is in substance equal to the width C of the contact leg 2'. The inner edge of the transition portion 5' forms in substance a semi circle having a radius R1. The outer contour or edge of the transition portion 5' comprises in substance two quarter circles having a radius R2, with a straight portion inbetween. The radius R2 is, naturally, larger than the radius R1.

Figure 10:
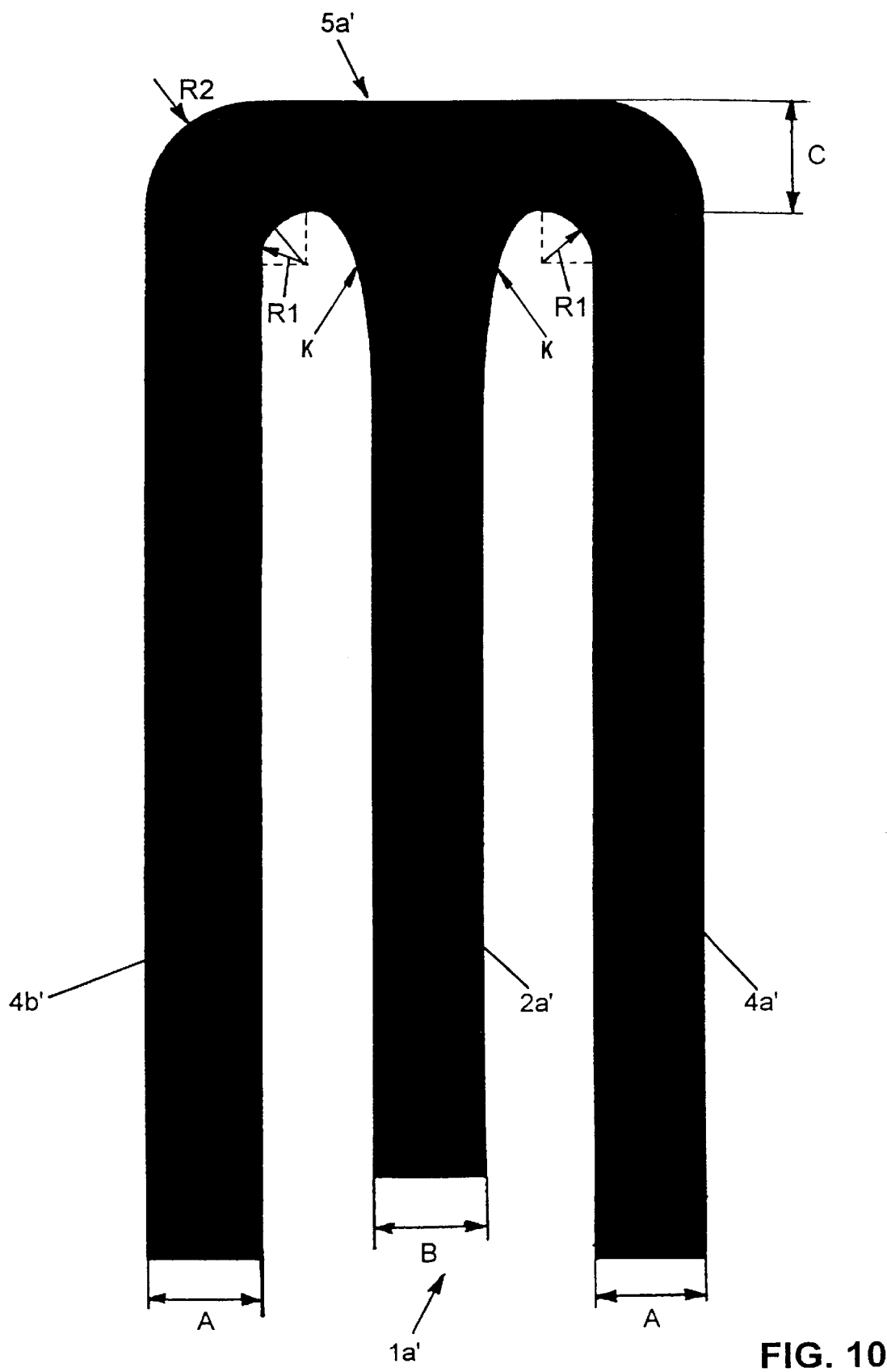
FIG. 10 is top plan view of a contact element similar to FIG. 5 showing an optimized contour of the edges.

FIG. 10 shows a top plan view of a contact element 1a' similar to the contact element 1a of FIG. 5. However, the contact element 1a' has an optimized contour of its edges or of its parameter. Here, the width F of the substantially straight centrally located contact leg 2a' is in substance equal to the width C of the two substantially straight mounting legs 4a' which are located outwardly and adjacent to the contact leg 2a' and extend parallel thereto. The width H of the transition portion 5a' in the apex point of the respective transitions between the legs 2a' and 4a' and 2a' and 4b', respectively, is approximately equal to the width F of the contact leg 2a' and the width G of the mounting legs 4a' and 4b'.

The inner edge of the transition portion 5a' forms in the area between the straight portion of the contact leg 2a' and the apex point of the respective transition between the legs 2a' and 4a', and 2a' and 4b', respectively, an approximately parabolic contour K. The contour K Is continued approximately in the point of the apex in substance as a quarter circle having a radius R1.

One end of said quarter circle merges into the straight edge of the mounting legs 4a' and 4b', respectively.

The outer contour of the transition portion 5a' is formed, in substance, by two quarter circles, each having a radius R2 with a straight portion in between. Again, radius R2 is naturally larger than radius R1.

The edge contours shown in FIGS. 9 and 10 optimize the characteristics of the respective contact elements with regard to spring characteristics, bending and deformation, respectively, torsion, force transmittal and distribution, amount of material to be used, stresses in the material, and so on.

What is claimed is:

1. A contact element for a smart card contacting apparatus, said contact element comprising;
   a substantially straight first or contact leg having a contact end for contacting with a contact pad of a smart card; and
   at least one second or mounting leg which is substantially straight,
   wherein said mounting leg is arranged adjacent to said contact leg, wherein a transition portion connects said first and second legs and wherein the transition portion comprises an outer edge defined by two quarter circles having a radius with a straight portion between said quarter circles.

2. The contact element of claim 1, wherein the mounting leg is parallel to the contact leg.

3. The contact element of claim 1, wherein said mounting leg of the contact element is longer than the contact leg of the contact element.

4. The contact element of claim 1, wherein the mounting leg of the contact element is connected to a terminal portion.

5. The contact element of claim 4, wherein the mounting leg of the contacting element is integrally formed with the terminal portion.

6. The contact element of claim 1, having in substance the shape of the letter J.

7. The contact element of claim 1, wherein the transition portion comprises an inner edge defined by a semi circle having a radius.

8. The contact element of claim 7, wherein the mounting leg has a width which is smaller than the width of the contact leg, and wherein further the width of the transition portion is equal to the width of the contact leg in the apex point of the transition between the two legs.

9. The contact element of claim 1, wherein the legs of the contact element are located in one plane.

10. The contact element of claim 9, wherein the contact end of the contact leg extends beyond said plane.

11. A contact element for a SIM card contacting apparatus, said contact element comprising:
    two substantially straight mounting legs and a substantially straight contact leg;
    wherein the contact leg comprises a contact end for contacting with a contact pad of a smart card, wherein the contact leg is arranged between said two mounting legs, wherein the contact element comprises a transition portion which connects the legs with each other and wherein the transition portion comprises an outer edge which consists of two quarter circles with radius and a straight portion in between.

12. The contact element of claim 11, having the shape of a W.

13. The contact element of claim 11, wherein the contact element Is a leaf spring.

14. The contact element of claim 11, wherein the contact element is made by stamping and bending.

15. The contact element of claim 11, wherein said legs are arranged parallel to each other.

16. The contact element of claim 15, wherein the contact leg of the contact element is shorter than the mounting legs, and wherein further the mounting legs of the contact element have substantially the same length.

17. The contact element of claim 11, wherein the inner edge of the transition portion in the area between the straight portion of the contact leg and the apex point of the respective transition between the contact leg and the respective mounting leg has an approximately parabolic contour, said contour continuing as a quarter circle having a radius, wherein one end of said quarter circle merges with the straight edge of the respective mounting legs.

18. The contact element of claim 17, wherein the width of the contact leg has a width equal to the width of the two mounting legs, and the width of the transition portion in the apex point of the respective transition between the contact leg and the respective mounting leg is equal to the width of the contact legs and the width of the mounting legs.

19. The contact element of claim 11, wherein at least one of said mounting legs of the contact element is connected with a terminal portion.

20. The contact element of claim 19, wherein the terminal portion is formed integrally with one of the mounting legs of the contact element.

21. A SIM card contacting apparatus comprising a contact block forming an opening defined by walls, at least one of said walls supporting a mounting leg of at least one contact element, said contact element also forming a contact leg for contacting with a contact pad of s SIM card, said contact leg being connected to said mounting leg by means of a transition portion wherein the transition portion comprises an outer edge defined by two quarter circles having a radius with a straight portion between said quarter circles.

22. The SIM card contacting apparatus of claim 21, wherein the contact elements are fixedly mounted in said contact block by injection molding.

23. The SIM card contacting apparatus of claim 21, wherein at least one pair of contact elements is mounted in said contact block, wherein one contact element of said pair of contact elements is mounted in a first wall extending perpendicularly with respect to the extension of the SIM card, while the other contact element of said pair of contact elements is mounted in a second wall opposite to said first wall, and
    wherein said transition portions of each pair are spaced but adjacent and opposite to each other.

24. The SIM card contacting apparatus of claim 23, wherein the free ends of the respective oppositely located contact elements form contact ends which are located adjacent to the respective first and second walls and extend beyond the top surface of the contact block onto which the SIM card is to be placed.

25. The SIM card contacting apparatus of claim 21, wherein the contact block has a smaller dimension in the longitudinal direction of a SIM card adapted to be contacted by said SIM card contacting apparatus as compared with the dimension of the contact block in the direction perpendicular thereto.

26. The SIM card contacting apparatus of claim 25, comprising a plurality of contact elements each having a mounting leg and wherein the mounting legs of said contact elements extend in longitudinal direction of the SIM card to be inserted and comprise, at their free ends, terminal portions for each contact element.

27. The SIM card contacting apparatus of claim 26, wherein said terminal portions are soldering terminal portions.

28. The SIM card contacting apparatus of claim 27, wherein the distance between the terminal portions of oppositely located contact elements is approximately 15.2 mm.

* * * * *